Patented Oct. 8, 1940

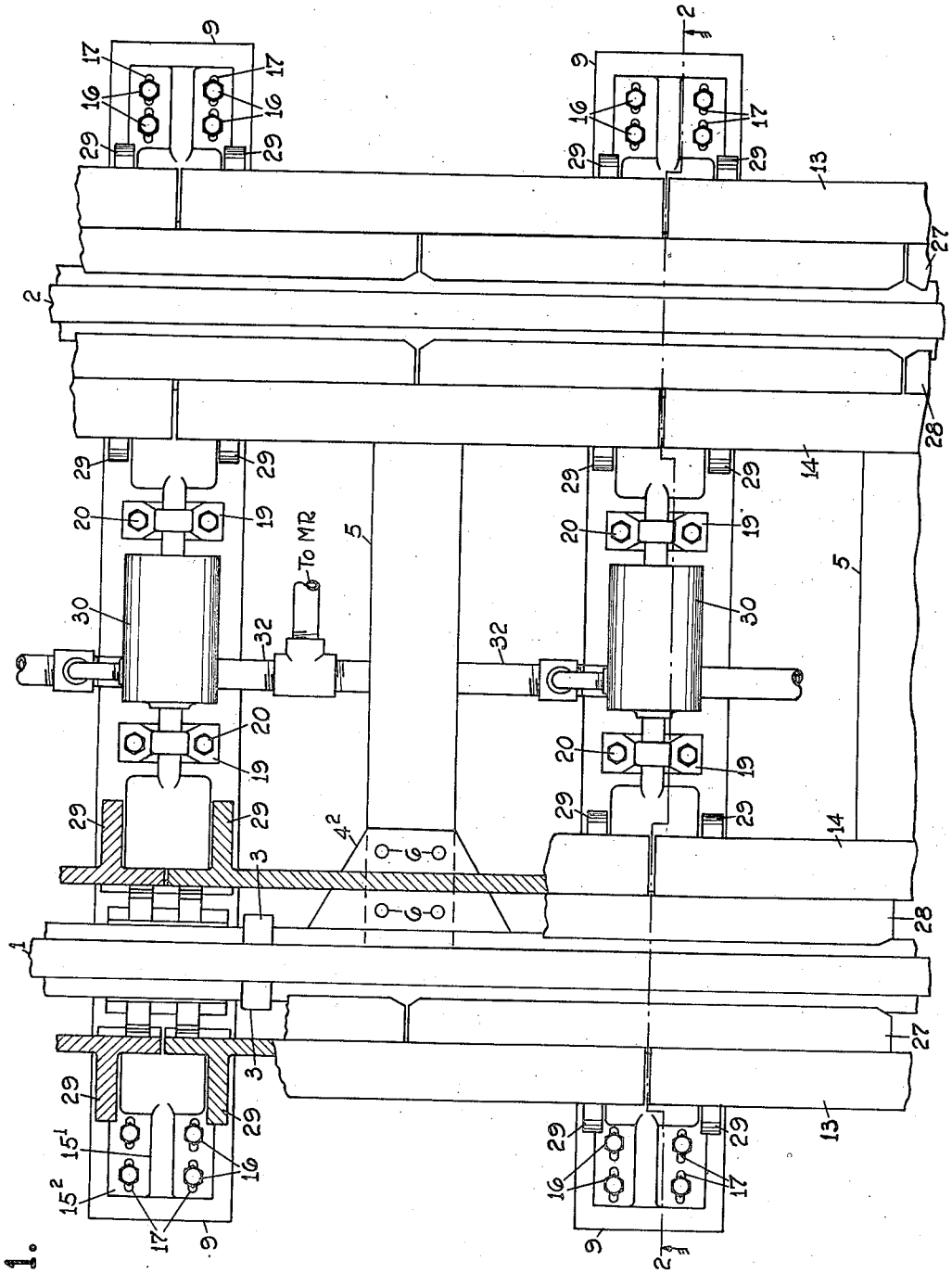

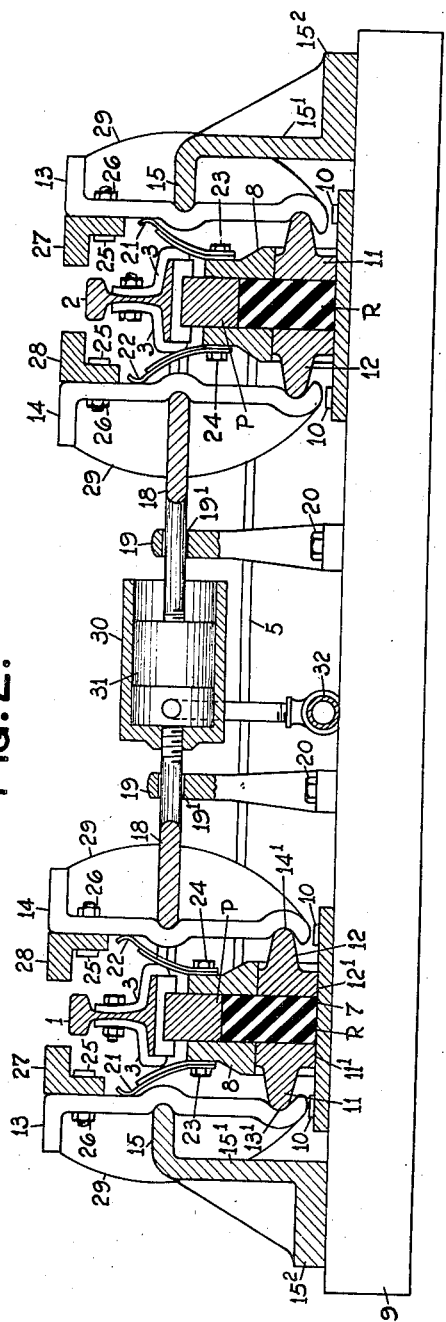
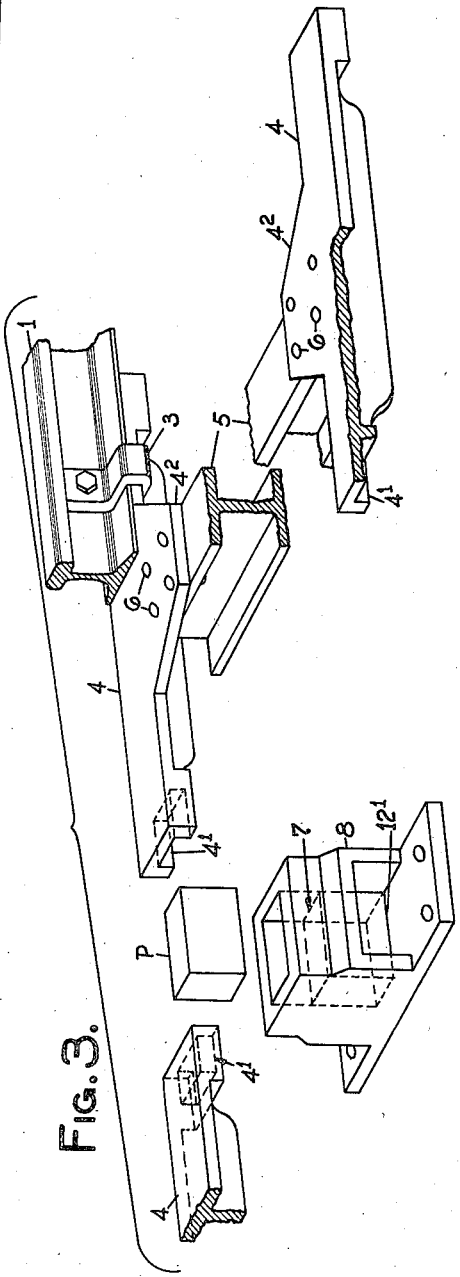

2,217,214

UNITED STATES PATENT OFFICE 2,217,214

CAR RETARDER FOR RAILROADS

Ned C. L. Brown, Scottsville, and Frederick C. Nilson, Rochester, N. Y., assignors to General Railway Signal Company, Rochester, N. Y.

Application August 23, 1938, Serial No. 226,338

12 Claims. (Cl. 188—62)

This invention relates in general to car retarders and has more particular reference to a car retarder of the track brake type as employed in railway practice.

In the operation of retarders of this type, it has been found desirable to vary the pressure of the brake shoes and hence the braking effect to correspond with the weight of the car to be retarded. To accomplish this, one usual way is to provide a control lever movable to various positions to cause the brake shoes to assume and hold various positions resulting in differing degrees of retardation.

It is proposed in accordance with this invention to provide a car retarder in which the amount of retardation is automatically varied by the weight of the car itself thereby eliminating the necessity of manually controlling the amount of retardation according to the weight of the car. More specifically, it is proposed to provide a car retarder operable by pressure means in which rubber has been employed, it being understood that rubber is non-compressible but will flow and transmit pressure, and to control the retarder apparatus by confining the rubber in a suitable receptacle whereby the weight of the car will determine the amount of brake shoe pressure.

A further purpose of the present invention is to provide a car retarder in which the brake shoe pressure exerted on opposite sides of a car wheel is balanced or equalized, and in which the brake shoe pressures on the two wheels mounted on the same axle of a railway track are balanced, that is, are not momentarily changed in spite of the variation of the space between the two wheels on such axle or the thickness of the wheels. In other words, the present invention contemplates the use of brake shoes in which not only the pressure on opposite sides of the wheels are balanced but in which the pressures on both sides of two car wheels mounted on the same car axle are substantially balanced in spite of irregularity in the spacing and thickness of such wheels on the axle.

Another purpose of this invention resides in the construction of a car retarder of the type in question, with means for preventing car wheels from clambing out from between the retarded shoes and being derailed, with very likely damage to the retarder and the car.

Other objects, purposes, and characteristic features of the present invention will be in part pointed out as the description progresses, reference being made to the accompanying drawings which show, solely by way of example and in no manner in a limting sense, one form which the invention may assume. For the purpose of further simplifying the illustration and facilitating in the explanation thereof, various parts constituting the embodiment of the invention have been shown in a manner to make clear the purposes and principles of the invention together with the mode of operation rather than with the idea of construction and arrangement of parts that would probably be employed in practice.

In the drawings:

Fig. 1 is a plan view of an embodiment of the invention with part of the brake shoes and brake beams adjacent rail 1 broken away to show the arrangement employed for supporting the brake beams.

Fig. 2 is a sectional elevation on line 2—2 of Fig. 1 viewed in the direction of the arrows.

Fig. 3 is a perspective view of the supporting means for the track rails with certain parts broken away to more clearly show the construction.

Referring now to the drawings and first to Figs. 1 and 2, there is here represented a section of railroad track constituted by rails 1 and 2 which are carried by an H-shaped rigid framework and secured to the vertical members of the framework by clamps 3. There is a series of frameworks, as would appear from Fig. 1, each framework comprising two castings 4 and an I beam 5, the castings as more clearly shown in Fig. 3, are in the general shape of a T beam with the supporting vertical section broken away at each end to form rectangular openings $4^1$ and the central portion of each casting being extended to form an outwardly projecting plate $4^2$. The plates $4^2$ of the castings are joined together, as shown in Fig. 3 and in part in Fig. 1, by rivets 6 or the like to the I beam 5, thus forming a rigid support for the rails 1 and 2.

The H frameworks are arranged end to end with adjacent ends of the vertical members supported at each tie 9 by a rectangular plunger P which is snugly received in the rectangular openings $4^1$ of the castings 4. The plunger P is arranged to operate vertically in the upper portion of a liquid tight chamber 7 of a pedestal 8, the lower portion of the chamber 7 being filled with a mass of resilient rubber R. The base of the pedestal 8 is securely anchored to the tie 9 by lag screws 10.

A consideration of the structure just described makes it clear that the rigid supporting framework insures proper spacing of the rails 1 and 2 and these frameworks are held together by the rails that they support. Furthermore, any movement of the frameworks in a direction transverse of the rails is prevented as previously pointed out, by the pistons P which support the adjacent ends of the castings.

The arrangement of parts about each track rail is identical and accordingly the following description of the parts associated with rail 1 should suffice to describe the apparatus for each track rail.

Considering the apparatus associated with track rail 1, the pedestal 8 further comprises two rectangular pistons 11 and 12 which are separated by the rubber R, the pistons being arranged to slide in rectangular openings $11^1$ and $12^1$ in a direction transverse to the rail 1, to engage hook shaped seats $13^1$ and $14^1$ at the lower ends of brake beams 13 and 14 respectively. The extremities of brake beam 13 are pivotally supported intermediate the upper and lower ends by a fixed pivot 15 which is supported by a vertical neck section $15^1$ and a base $15^2$, the base being anchored to the tie 9 by lag screws 16 which pass through slots 17, the slots being provided for moving the pivoting device toward and away from the rail.

Brake beam 14 is pivotally supported at each end by a movable pivot 18 which is free to slide in an aperture $19^1$ of a fixed support 19 that is secured to tie 9 by bolts 20. The brake beams 13 and 14 are held an equal distance from the rail and against movement toward the rail by leaf springs 21 and 22 respectively which are secured at their lower ends to the pedestal 8 by bolts 23 and 24 respectively.

It may be pointed out here that pivots 15 and 18 are arranged to pivotally support the adjacent ends of brake beams 13 and 14 respectively and pistons 11 and 12 are likewise arranged to engage the hook shaped seats $13^1$ and $14^1$ of adjacent ends of their respective brake beams.

Attached to the upper ends of brake beams 13 and 14, in any suitable manner such as by bolts 25 and nuts 26, are the brake shoes 27 and 28 respectively which extend parallel to rail 1 and are staggered with respect to the brake beams, that is, each brake beam carries one half of two adjacent brake shoes, thus providing a substantially rigid and continuous brake shoe.

It will be noted from the plan view shown in Fig. 1, that the brake beams are provided at each end with vertical supporting ribs 29 which serve to strengthen the beams and also provide guides for the pivots 15 and 18, each pivot being arranged to act against two adjacent brake beams. The brake beams in practice are preferably constructed of suitable cast steel alloy, giving them the strength required and permitting them to be readily shaped as shown and the brake shoes are preferably constructed of rolled steel and manufactured by the same process used in the manufacture of steel track rails.

Figs. 1 and 2 show the retarder parts in the positions they would assume for normal retarder operation, and in order to operate the brake shoes to an open position, which would permit a car to pass through without being retarded, suitable hydraulic control means have been provided.

These means comprise a cylinder 30 and a piston 31 which are freely supported by the two supports 19 as shown in the drawings, the cylinder 30 being secured to the extreme right end portion of the movable pivot 15 associated with track 1, and the piston 31 being secured to the movable pivot 18 associated with track rail 2. The cylinders 30 are connected in parallel, so to speak, by a pipe 32 which is connected to a suitable pressure tank (not shown) which may be operated in any desired manner to vary the pressure of the liquid in cylinders 30.

It is obvious that if the pressure of the liquid in cylinders 30 is reduced, the centering springs 22 will move the inner brake beams 14 away from their respective rails 1 and 2 and, as cylinder 30 and piston 31 are freely supported, the pressure against the inner brake beams 14 will be equalized. This will reduce the pressure against the lower ends of brake beams 13 and allow springs 21 to move these outer brake beams an equal distance from rails 1 and 2.

It is evident from the foregoing description of the parts that when a car moves onto rail 1, the plunger P will be forced downwardly thereby applying pressure against the rubber R, the amount of pressure varying with the weight of the car. This will force the rubber against the pistons 11 and 12 causing them to move outwardly against the lower ends of brake beams 13 and 14 respectively to thereby move the upper ends of said brake beams inwardly to cause frictional engagement between the wheels and the brake shoes.

It is to be understood that the invention is not limited to the use of rubber as a medium for transmitting pressure as a liquid such as oil, an anti-freeze water solution or the like could be employed. It is contemplated, when using a liquid in place of rubber, to provide centering springs having sufficient strength to lift the track rail and restore the brake beams and plungers to their normal positions after a car has passed through the retarder.

It may be pointed out here that the pressure exerted by brake shoes 27 and 28 will be equal or balanced regardless of the position of the car wheel on the rail due to the fact that a large pressure exerted against one side of a wheel will be transmitted through the pistons 11 and 12 and the rubber R to the other shoe beam and result in an equalization of pressure exerted by the two brake shoes. Furthermore, as the movable pivots 18 are floatingly supported, an increase in pressure on one of the brake beams due to the center lines of the rail and wheel being out of alinement, will not only be transferred to its associated shoe beam but it will also be transferred to the corresponding shoe beam of the other rail. In other words compensation, in the form of equalization of pressures, is provided for irregular spacing of car wheels on a car axle.

If by reason of excessive retardation the wheels of a car start to climb out from between the retarder shoes 27 and 28, the weight on the rails 1 and 2 is immediately relieved, thus reducing the pressure on the rubber R exerted by the plunger P. This results in a temporary decrease of pressure against the sides of the wheels and effectively prevents any further climbing out of the car wheels.

With this in mind it is obvious that this invention discloses a retarder constructed so as to provide maximum retardation for all cars regardless of their weight and this is accomplished without danger of the cars climbing out from between the brake shoes. This makes it possible to use a much shorter retarder than would be required if a retarder is used in which the brake shoes are prepositioned in accordance with the weight of the car to be retarded, because with retarders of this type it is necessary to keep the applied pressure substantially lower than the pressure required to lift the car in order to guard against derailment.

Another feature of this invention resides in the fact that when the retarder shoes are in the operating position the opening between the shoes can be adjusted to the average size of a car wheel thus making it possible to transmit the pressure against the wheels with very little movement of the brake beams. This reduces to a large extent the impact forces that are set up when a car passes through the retarder and substantially increases the life of the parts. These impact forces are further reduced due to the fact that, as previously mentioned, the brake shoes are arranged to form a continuous substantially rigid brake shoe with the brake beams pivoted at their ends to prevent any whipping movement.

Applicants have thus described the construction of car retarder or track brake which is extremely flexible in its operation, in which the retardation is proportional to the weight of the car and in which the maximum retardation may be obtained for cars of different weights. Further, applicants have eliminated the danger of a car climbing out from between the brake shoes and becoming derailed and provided a car retarder in which the impact forces have been greatly reduced.

In describing the invention, attention has been directed to one specific embodiment thereof, without attempting to point out the various alternative or optional features of construction, or the different organizations or combinations that may be employed. A liquid, such as oil or the like, may be substituted for the rubber R, as previously pointed out, and a lever arrangement, such as shown in the Howe Patent No. 1,757,428 issued May 6, 1930, may be substituted for operating the movable pivots 18 without departing from the scope of the invention. It should be understood that the particular construction illustrated has been shown for the purpose of explaining the nature of the invention and discussing its various advantageous features, and that various modifications, and changes may be made to adapt the invention to the varying conditions that may be encountered in practice, all without departing from the scope of the invention or the idea of means underlying the same.

What we claim is:

1. In a car retarder of the track brake type, in combination, a support, a fluid tight container on the support, a plunger vertically slidable in the container, a track rail carried by the plunger, a brake beam pivoted adjacent the rail, a brake shoe carried by the upper end of the brake beam; a piston slidable in the container and operatively connected to the lower end of the brake beam, and a substantially non-compressible fluid material completely filling the container.

2. In a car retarder of the track brake type, in combination, a support, a fluid tight container on the support, a plunger vertically slidable in the container, a track rail carried by the plunger, a brake beam pivoted adjacent the rail, a brake shoe carried by the upper end of the brake beam, a piston slidable in the container and operatively connected to the lower end of the brake beam, and a non-compressible elastic material completely filling the container.

3. In a car retarder of the track brake type, in combination, a track rail, a brake beam adjacent the rail, a brake shoe carried by the brake beam in position to contact the side of a car wheel on the rail, a movable support for the rail, and a confined mass of non-compressible fluid material so positioned relatively to the rail support and the brake beam that downward movement of the rail support causes the fluid material to urge the brake shoe toward the rail.

4. In a car retarder of the track brake type, in combination, a brake shoe positioned one at each side of a track rail; each brake shoe being secured to the upper end of a brake beam; pivoted means for supporting each brake beam intermediate the upper and lower ends; a connection between the lower ends of said brake beams comprising two pistons separated by a confined substantially non-compressible elastic material; supporting means for the track rail, said means being arranged to act downwardly against said substantially non-compressible material to move the lower ends of said beams outwardly from the rail thereby causing said brake shoes to frictionally engage the sides of the car wheels and apply pressure thereto in accordance with the weight of the car on the rail.

5. In a car retarder of the track brake type, in combination; a brake shoe positioned one at each side of a track rail, each brake shoe being secured to the upper end of a brake beam; pivoted means for supporting each brake beam intermediate the upper and lower ends; a connection between the lower ends of said brake beams comprising two pistons separated by a non-compressible fluid material; supporting means for the track rails, said means being arranged to act downwardly against said non-compressible fluid material to move the lower ends of said beams outwardly from the rail thereby causing said brake shoes to frictionally engage the sides of the car wheels and apply pressure thereto in accordance with the weight of the car on the rail and spring pressed means for restoring the brake beams to their original positions after a car has passed through the retarder.

6. In a car retarder of the track brake type, in combination; a brake shoe positioned one at each side of a track rail, each brake shoe being secured to the upper end of a brake beam; pivoted means for supporting each brake beam intermediate the upper and lower ends; a connection between the lower ends of said brake beams comprising two pistons separated by a non-compressible elastic material; supporting means for the track rails, said means being arranged to act downwardly against said non-compressible material to move the lower ends of said beams outwardly from the rail thereby causing said brake shoes to exert equal forces against the sides of a car wheel irrespective of the exact location of such a wheel to the normal position of the brake shoes.

7. In a car retarder of the track brake type in which brake shoes engage the sides of moving car wheels, a brake shoe positioned one at each side of a track rail and secured to the upper end of a brake beam, a movable pivot for supporting one brake beam and a fixed pivot for supporting the other beam intermediate their respective upper and lower ends, a connection between the lower ends of said beams comprising two pistons separated by a non-compressible fluid material, supporting means for the track rail arranged to move downwardly against said non-compressible fluid material to force said piston outwardly thereby causing said brake shoes to frictionally engage the sides of a car wheel and means for operating said movable pivot relatively to the rail to permit a car to pass between the shoes without frictional engagement.

8. In a car retarder of the track brake type, in combination, two rails constituting a stretch of single track, a brake beam adjacent each side of each rail, a brake shoe carried by each beam in position to contact the side of a car wheel on the rail, a movable support for each rail, and a confined mass of non-compressible fluid material so positioned relatively to the rail supports and the two brake beams that downward movement of the rail supports causes the fluid material to urge the brake shoes towards the rails.

9. In a car retarder of the track brake type, in combination, two rails constituting a stretch of single track, a brake beam adjacent each side of each rail, a brake shoe carried by each beam in position to contact the side of a car wheel on the rail, a movable support for each rail, and a confined mass of non-compressible elastic material so positioned relatively to the rail supports and the two brake beams that downward movement of the rail supports causes the elastic material to urge the brake shoes towards the rails.

10. In a car retarder of the track brake type, in combination, two rails constituting a stretch of single track, a brake beam adjacent each side of each rail, a brake shoe carried by each beam in position to contact the side of a car wheel on the rail, a movable support for each rail, a confined mass of non-compressible fluid material so positioned relatively to the rail supports and the two brake beams that downward movement of the rail supports causes the fluid material to urge the brake shoes towards the rails and a floating adjusting means between the two rails and freely movable transversely of the rails for adjusting the initial position of each of the two inner brake beams.

11. In a car retarder of the type engaging the sides of the wheels of passing cars, two rails constituting a stretch of single track, retarder shoes adjacent the sides of each rail and operable toward the rails against biasing means urging the shoes outwardly from the rails, connecting means between the retarder shoes adjacent each rail comprising two pistons separated by a non-compressible fluid material, supporting means for the rails said means being arranged to press downwardly against the non-compressible fluid material to urge the brake shoes towards the rails. a fixed pivot for each outside brake shoe, a movable pivot for each inside shoe and freely supported connecting means between the movable pivots whereby the pressures exerted against the sides of the wheels on the same axle are balanced or equalized.

12. In a car retarder of the track brake type, in combination, a support, a fluid tight container on the support, a plunger slidable in the container, a member operably associated with the plunger and positioned to be moved by weight on a car wheel of a passing car to thus move the plunger, a brake beam pivoted adjacent the member, a brake shoe carried by the upper end of the brake beam; a piston slidable in the container and operatively connected to the lower end of the brake beam, and a substantially non-compressible fluid material completely filling the container.

NED C. L. BROWN.
FREDERICK C. NILSON.